United States Patent
Wester et al.

(10) Patent No.: US 7,353,337 B2
(45) Date of Patent: Apr. 1, 2008

(54) REDUCING CACHE EFFECTS OF CERTAIN CODE PIECES

(75) Inventors: Rogier Wester, Waalre (NL); Jan-Willem Van De Waerdt, Hamburg (DE); Gert Slavenburg, Los Altos, CA (US)

(73) Assignee: NXP B.V., Eindhoven (NL)

( * ) Notice: Subject to any disclaimer, the term of this patent is extended or adjusted under 35 U.S.C. 154(b) by 335 days.

(21) Appl. No.: 10/546,757

(22) PCT Filed: Feb. 23, 2004

(86) PCT No.: PCT/IB2004/000455

§ 371 (c)(1),
(2), (4) Date: Aug. 24, 2005

(87) PCT Pub. No.: WO2004/075066

PCT Pub. Date: Sep. 2, 2004

(65) Prior Publication Data

US 2006/0179225 A1    Aug. 10, 2006

Related U.S. Application Data

(60) Provisional application No. 60/448,871, filed on Feb. 24, 2003.

(51) Int. Cl.
*G06F 12/00* (2006.01)

(52) U.S. Cl. .................. 711/125; 711/118; 711/119; 711/128; 711/147; 712/200; 712/216; 712/225; 712/228; 712/245

(58) Field of Classification Search .......... 711/125, 711/118, 119, 128, 147; 712/200, 216, 225, 712/228, 245
See application file for complete search history.

(56) References Cited

U.S. PATENT DOCUMENTS 4,463,424 A * 7/1984 Mattson et al. ............. 711/136

(Continued)

FOREIGN PATENT DOCUMENTS

EP    0 481 616    4/1992
EP    0 856 797    8/1998

OTHER PUBLICATIONS

Kadayif, I., et al: "An Energy Saving Strategy Based on Adaptive Loop Parallelization", DAC 2002, Jun. 10-14, 2002, New Orleans, LA, USA.

(Continued)

*Primary Examiner*—Stephen C. Elmore
(74) *Attorney, Agent, or Firm*—Peter Zawilski

(57) ABSTRACT

Cache memory interrupt service routines (ISRs) influence the replacement of necessary instructions of the instruction stream they interrupt; it is known as "instruction cache washing," since the instructions contained in the instruction cache prior to execution of the ISR are overwritten by the ISRs instructions. To reduce trashing of the instruction cache memory, the instruction cache is dynamically partitioned into a first memory portion and a second memory portion during execution. The first memory portion is for storing instructions of the current instruction stream, and the second memory portion is for storing instructions of the ISR. Thus, the ISR only affects the second memory portion and leaves instruction data stored within the first memory portion intact. This partitioning of the instruction cache reduces processor fetch operations as well as reduces power consumption of the instruction cache memory.

34 Claims, 4 Drawing Sheets

U.S. PATENT DOCUMENTS

| | | | |
|---|---|---|---|
| 5,357,623 A * | 10/1994 | Megory-Cohen | 711/129 |
| 5,394,531 A * | 2/1995 | Smith | 711/136 |
| 5,537,635 A * | 7/1996 | Douglas | 711/129 |
| 5,696,932 A * | 12/1997 | Smith | 711/118 |
| 5,717,893 A * | 2/1998 | Mattson | 711/129 |
| 6,032,227 A * | 2/2000 | Shaheen et al. | 711/129 |
| 6,594,729 B1 * | 7/2003 | Sturges et al. | 711/129 |
| 6,898,694 B2 * | 5/2005 | Kottapalli et al. | 712/207 |

OTHER PUBLICATIONS

Lee, Kil-Whan, et al: "The Cache Memory System for CalmRISC32" Dept. of Computer Science, Yonsei Univ., Seoul 120749, Korea.

* cited by examiner

REDUCING CACHE EFFECTS OF CERTAIN CODE PIECES

CROSS REFERENCE TO RELATED APPLICATION

This application claims the benefit of U.S. provisional application Ser. No. 60/448,871 filed 24 Feb. 2003, which is incorporated herein by reference.

The invention relates to the area of processor caches and more specifically to the area of processor instruction caches.

In computer systems, cache memories are used to decrease processor (CPU) access times to information, in the form of data and instructions, stored within main memory in the form of a read only memory (ROM) or a random access memory (RAM). Caches are on-chip memory banks that contain copies of certain pieces of data and instructions stored in main memory. Typically, there are two types of caches, data and instruction; however within this disclosure, only instruction caches are addressed.

An instruction cache contains pieces of code for execution by the CPU. Whenever the CPU executes code that is already resident in the cache, for example while executing a sequence of instructions that form a loop, the execution of the loop is faster than accessing the main memory to read all of these loop instructions every time they are to be executed. However, when these instructions are not stored in the cache memory, then a cache-miss occurs, and the CPU has to wait until the needed data is fetched from the main memory into the cache memory. Once the data is fetched into the cache memory, the CPU resumes execution of the instructions. Unfortunately, during these fetch operations the CPU incurs stall cycles, while waiting for the needed data, and these waste valuable CPU processing bandwidth.

During fetching operations, data is fetched from main memory in blocks, having a block size. The block size defines an amount of data that is fetched in one operation from main memory. Caches are organized in terms of cache ways, and cache sets of cache blocks. Depending on an instruction address of an instruction that is being executed by the processor, data fetched from memory having a block size is stored within a memory location within the cache set. The memory location within the cache set is in dependence upon the instruction address. The cache way within which the data block is stored is dependent on the cache replacement algorithm that is in use by a cache controller for the cache memory. Thus, for instance, bits 11 down to 6 of the instruction address determine the cache set for storing of the data fetched from main memory. In this example, the cache set is defined by bits 11 down to 6, and is applicable to a cache having a total cache size of 32 KB, with a way associativity of 8, and a blocksize of 64 bytes. This type of caches therefore has 64 cache sets, and each has 8 lines—the cache way associativity—with each line being 64 bytes in length.

Typically, in cache memories, there is a certain replacement strategy for replacing of data stored within the cache with newly fetched blocks of data. The cache controller determines which of the 8 cache lines are to be replaced in the cache memory with a newly fetched data block. For this, the cache controller hardware, implements, for instance, a least recently used (LRU) process, where the cache controller hardware determines which cache line has not been accessed in the longest time and which cache line is most likely not needed for subsequent program flow. The newly fetched data is then placed in this cache line.

Interrupt service routines (ISRs) are segments of instruction data including executable instructions that are executed whenever an interrupt is serviced. ISRs interrupt regular execution of a current instruction stream by the CPU, the CPU then services the instructions contained in the ISR, and typically resumes the current task once the ISR is completed. Of course, sometimes another task is resumed when the ISR affects the subsequent tasks of the processor, where the task scheduler of the Operating System typically handles this. Unfortunately, ISRs influence cache contents and thus have a significant effect on the execution time of the instruction stream they interrupt. Unfortunately, the interrupted instruction stream upon resumption thereof often requires fetching of some instructions from main memory, that were previously stored in the cache, because the ISR has replaced that instruction data with its own instruction data. Thus, ISRs increase the amount of fetching operations that are performed in order to resume execution of the interrupted instruction stream. ISRs typically do not contain loops within their instructions due to the simple nature and required speed for their execution. Thus, they have little reason to utilize the instruction cache. The way associativity of the cache, combined with a LRU replacement policy, potentially results in the ISR replacing all existing cache instruction data, whereas the re-use of a single cache way, or a sub-set of the available ways, by not using full LRU by the ISR would result in better overall performance of the system. Because of the non-loop nature of ISRs it is better to have the ISR replace its own instruction data from the cache, rather than instruction data that was present before the ISR started. Typically, a benefit to using instruction caches with ISRs is that when ISR instructions are loaded into the cache, a few more instructions are also fetched into the instruction cache memory, and hence the execution time of the ISRs is decreased.

A "working set" is a set of instructions that need to be available to a process in order for the processor to execute a current task efficiently. For example, the working set for instructions contained in a loop process is an amount of instructions that are executed from the loop start to the loop end. In some cases however, the working set may exceed the size of the instruction cache, thus fetching operations replace instructions stored within the instruction cache with newly fetched instructions. Unfortunately, this overwrites some previously stored instructions in the instruction cache because of the limited cache size. This replacement of necessary instructions is termed to those of skill in the art as "instruction cache trashing," since the instructions contained in the cache prior to execution of the ISR are overwritten by the ISR's instructions. Thus, execution of an ISR is similar to that of enlarging the working set, in that additional fetches are required in order for the program to execute efficiently. In both cases, additionally fetching operations are necessary in order to process the instructions by the CPU because the interrupted stream typically needs to have additional data fetched in order to resume its operation. Of course not only ISRs interrupt efficient processing, other code segments that have similar cache characteristics as ISRs, and that do not have any loop instructions contained therein, also serve to disturb a currently executing program's working set.

For example in a Philips Digital Video Platform (DVP) a two CPU chip is utilized, where one chip is a RISC (MIPS®) and the other a VLIW (very large instruction word) processors such as the TriMedia®. The TriMedia® is a co-processor that executes all video and audio programs. However, during processing of data by this VLIW, a relatively big part of the VLIW CPU power is wasted due to instruction cache trashing. Typically more than half of the CPU power is consumed by stall cycles resulting from instruction cache trashing and poor access to main memory. One of the reasons for the decreased processing power may be due to driver model of DVP, resulting large pieces of code that are executed in the ISRs. Due to many reloads of trashed instructions from main memory, the main memory bandwidth requirements are also increased.

A need therefore exists for reducing instruction cache trashing to assist in increasing CPU processing power, decreasing main memory bandwidth, as well as in reducing overall power consumption associated with data block transfers from memory as a result of trashing. It is therefore an object of the invention to provide an instruction cache supporting reduced replacement of instructions with other instructions that are for use by another interrupting process.

In accordance with the invention there is provided a method of instruction cache management comprising the steps of: providing a first instruction cache memory; providing first instruction data within the first instruction cache memory and for execution; providing a start of temporary cache indication, the start of temporary cache indication for initiating execution of a second program stream; creating a temporary cache within the first instruction cache memory upon receiving the start of temporary cache indication, the temporary cache for use in caching of instruction data for use in executing of the second program stream; executing instructions within the second program stream; and, removing the temporary cache upon execution of an instruction for terminating execution of the second program stream.

In accordance with the invention there is provided a method of instruction cache management comprising the steps of: providing a first instruction cache memory; providing first instruction data within the first instruction cache for execution; providing an indication of a second stream of instruction data for execution one of in parallel with and in priority over the first instruction data, the second stream of instruction data having substantially smaller cache requirements over the cache requirements met by the first instruction cache memory; creating a temporary cache within the instruction cache memory upon receiving an indication of the second stream's imminent execution, the temporary cache for use in caching of the instruction data of the second stream for use in execution of the second stream of instruction data; executing instructions within the second stream of instruction data; and removing of the temporary cache upon execution of an instruction for terminating execution of the second stream of instruction data.

In accordance with the invention there is provided a cache memory comprising: an instruction cache memory for caching of instruction data of a first instruction data stream; a determination circuit for determining a presence of a second instruction data stream having known characteristics and for partitioning the instruction cache memory into a first memory portion and a temporary memory portion in dependence upon the presence of the second instruction data stream, wherein an instruction within the second instruction data stream is of an identifiable second type, the first memory portion for caching of instructions of the first instruction data stream and the temporary memory portion for caching of instructions of the second instruction data stream.

In accordance with the invention there is provided an integrated circuit comprising: an instruction cache memory for caching instructions for a first program stream; and, a circuit for creating and removing a temporary cache within the instruction cache memory, the temporary cache memory for being smaller in size than the instruction cache memory and for use in caching instructions within a second program stream that is other than the first program stream.

In accordance with the invention there is provided a storage medium having data stored therein for defining integrated circuit functional blocks, the integrated circuit functional blocks including: an instruction cache memory for caching instructions within a first program stream; and, a first circuit for creating and removing a temporary cache within the instruction cache memory, the temporary cache memory for being smaller in size than the instruction cache memory and for use in caching instructions within a second program stream that is other than the first program stream.

Exemplary embodiments of the invention will now be described in conjunction with the following drawings, in which.

Figure 5A:
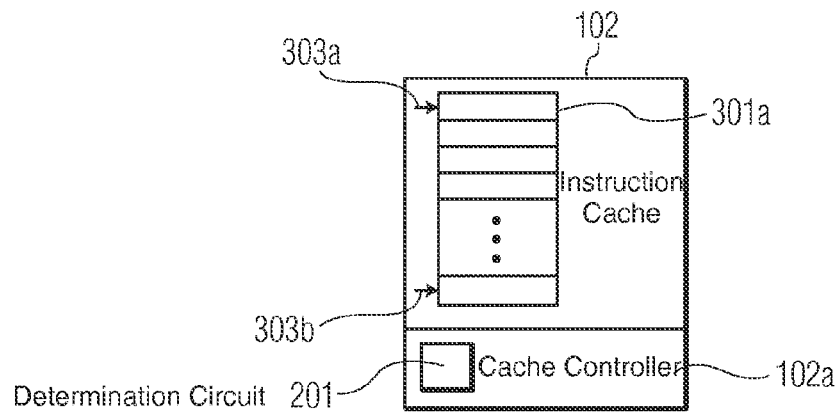
FIG. 5a illustrates a first program stream pre-interrupt portion stored within the instruction cache.
Figure 5B:
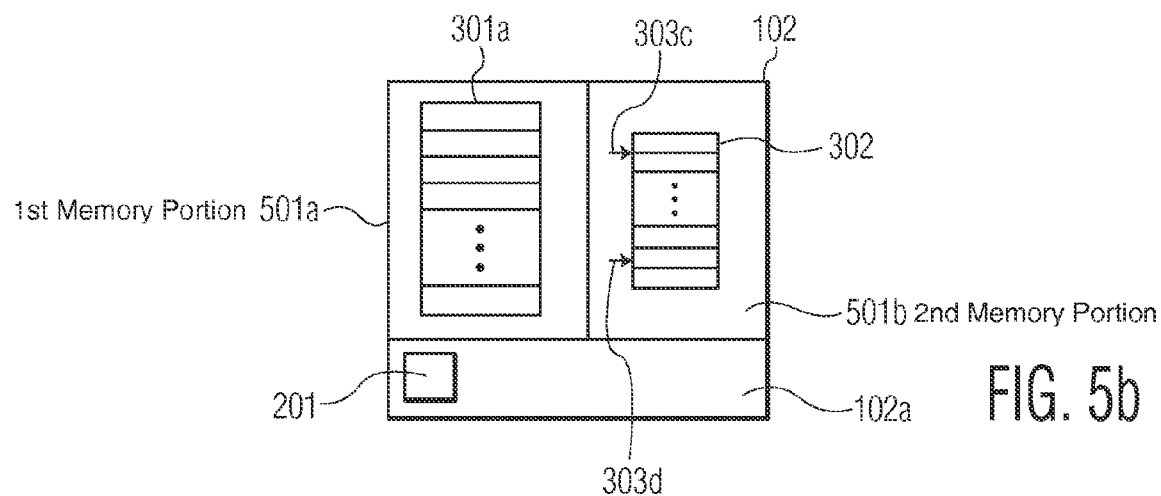
Figure 5C:
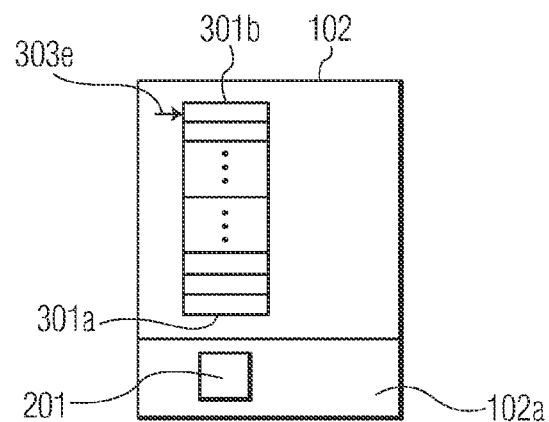

FIG. 5b illustrates the instruction cache memory partitioned into a first memory portion and a second memory portion, the first memory portion having stored therein the first program stream pre-interrupt portion and the second memory portion having stored therein a second program stream; and, FIG. 5c illustrates the instruction cache memory after having the partition removed, with the instruction cache memory having stored therein a portion of the first program stream post-interrupt portion and a portion of the first program stream pre-interrupt portion.

In the Internet publication of I. Kadayif et al, "An Energy Saving Strategy Based on Adaptive Loop Parallelization," a multiple processor strategy is evaluated in order to allow each nested loop to execute using different number of processors, if doing so is beneficial to system energy savings. Thus, processors are shut down, or placed in a sleep state, when they are not being utilized for processing of information. Of course, since each of these processors typically has a cache memory associated therewith, the cache memory ends up being in a similar state to that of the processor when it is placed in a power saving mode.

In the Internet publication of Kil-Whan Lee et al, "THE CACHE MEMORY SYSTEM FOR CalmRISC32," a dual data cache system structure is proposed for use as the cache memory system for CalmRISC32 to improve performance and reduce power consumption. In this case, the cooperative cache system is applied to both data cache and instruction cache. Between the two types of locality, spatial and temporal locality, there is a high possibility that recently accessed items are accessed again in the near future in the temporal locality. Thus, a first cache memory is provided to address the spatial locality, and a second cache memory is provided to address the temporal locality. Both cache memories assist each other to improve—reduce—processor stall cycles. However, utilizing both of these cache memories does not reduce effects resulting from instruction cache trashing.

Figure 1:
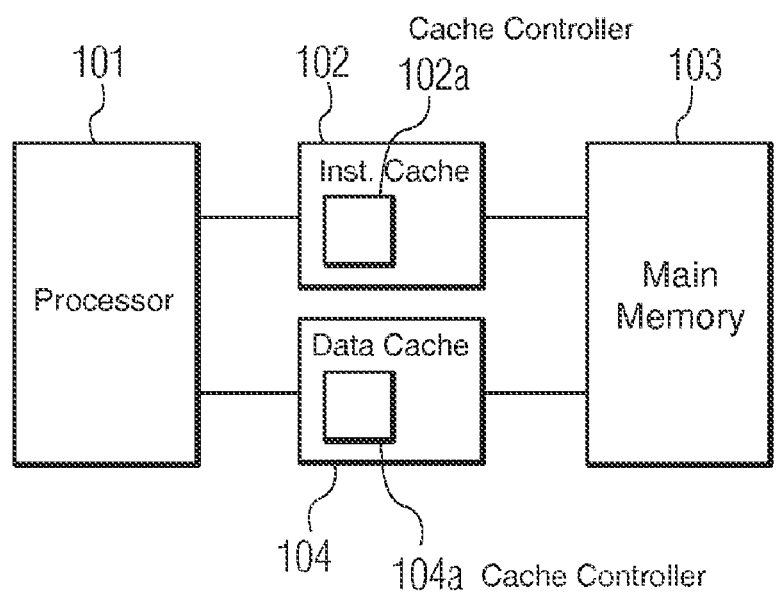
FIG. 1 illustrates a high level diagram of a portion of a computer processing system having a cache memory.

Referring to FIG. 1, a high level diagram of a portion of a computer processing system is shown. The processing system includes a CPU 101 that receives instruction data for processing via an instruction cache memory 102 and other data for processing via a data cache memory 104, hereinbelow referred to as an instruction cache 102 and a data cache 104, respectively. Each cache, 102 and 104, is in communication with a main memory 103. The instruction cache 102 is for caching of only instruction data from the main memory 103, as it is required by the processor 101. Within the instruction cache 102 there is disposed an instruction cache controller 102a, including a fetching unit. The instruction cache controller 102a controls storage of data blocks within the instruction cache 102. The data cache 104 is for use in caching of data, which is other than instruction data, used for processing by the CPU 101. The data cache 104 has disposed therein a data cache controller 104a, including another fetching unit.

Both cache controllers 102a and 104a are for controlling cache line replacement within each respective cache 102 and 104, as well as for fetching of instruction and other than instruction data from main memory 103 for storage within each respective cache 102 and 104. For example, cache controllers 102a and 104a each execute a LRU (last recently used) process in order to determine which cache lines are to be replaced within their respective caches 102 and 104 with the newly fetched data.

Figure 2:
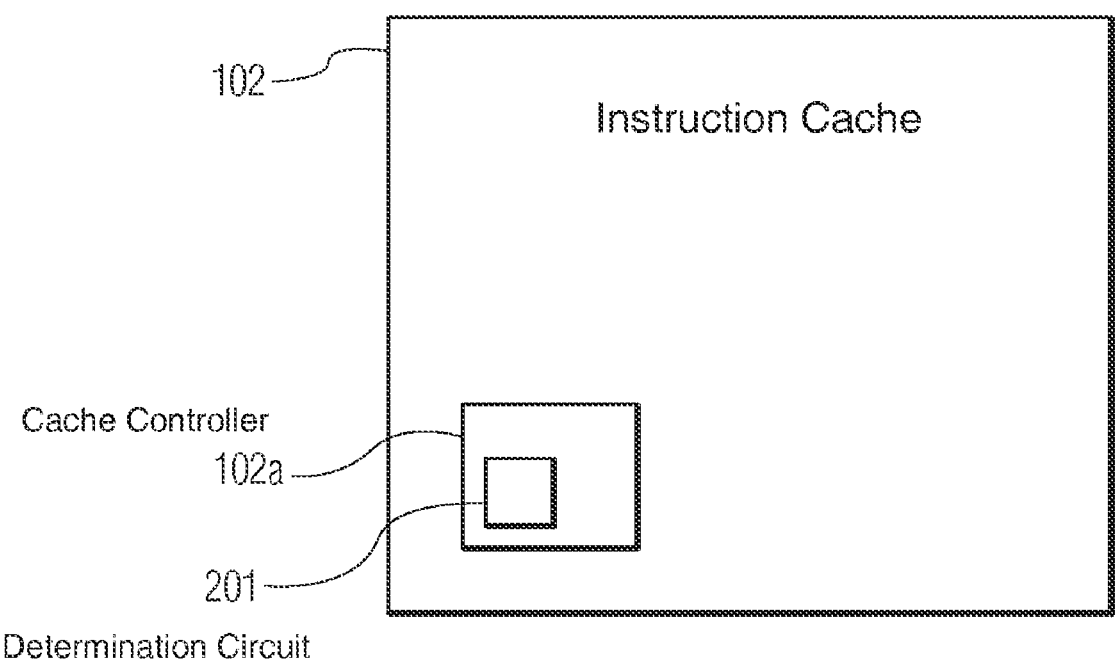
FIG. 2 illustrates an embodiment of the invention, a determination circuit disposed in hardware within the cache memory.

Referring to FIG. 2, an embodiment of the invention is shown. In this case a determination circuit 201 is disposed within the instruction cache 102. The determination circuit 201 is for use in analyzing of instruction data retrieved from main memory 103 and provided to the instruction cache 102 using an instruction analysis circuit.

Figure 3:
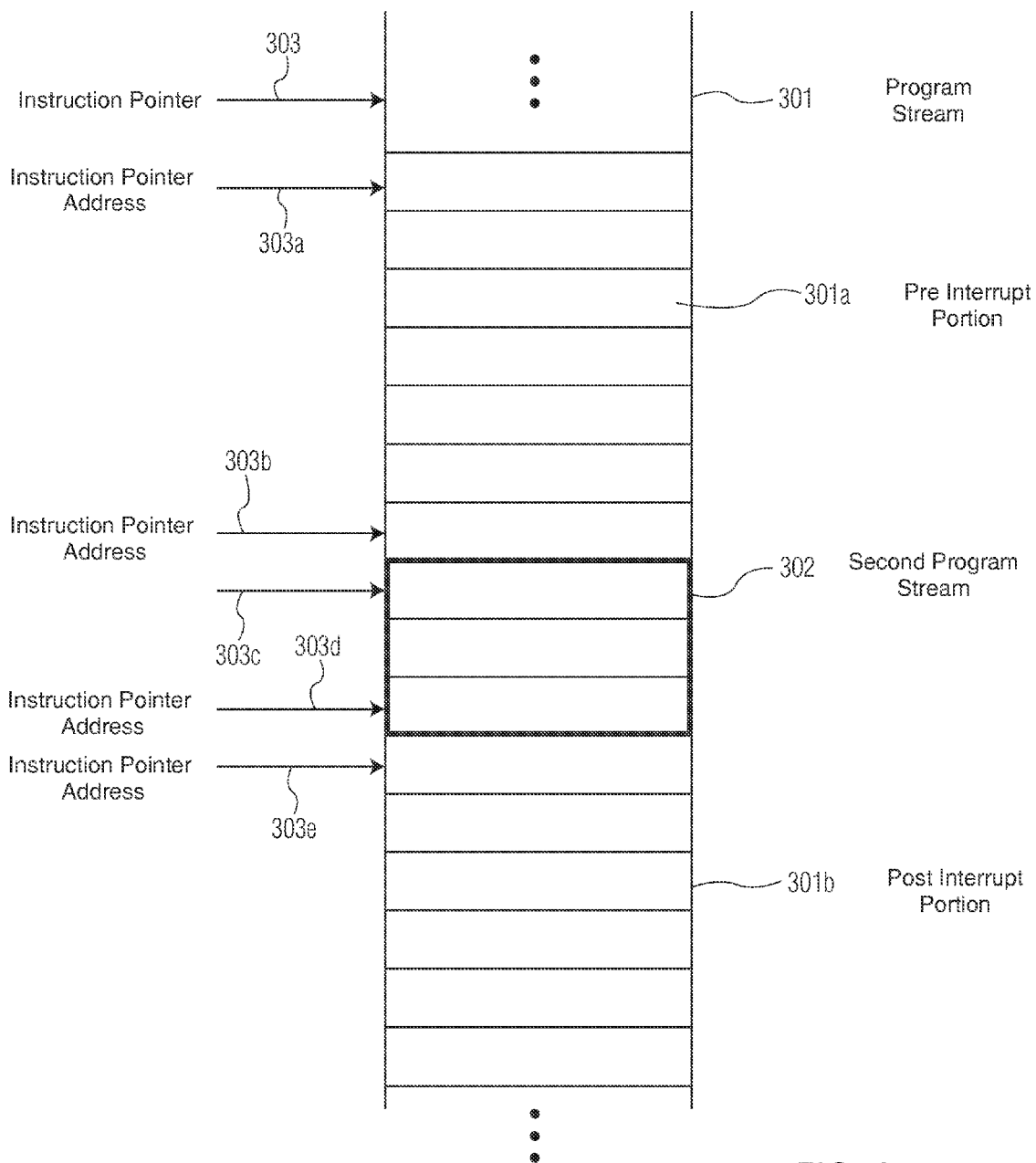
FIG. 3 illustrates a first program stream having a pre-interrupt portion and a post interrupt portion, with a second program stream embedded therebetween.

Referring to FIG. 3, a first program stream is shown 301 having a pre-interrupt portion 301a and a post interrupt portion 301b, with a second program stream 302 embedded therebetween. The second program stream is optionally in the form of an interrupt service request (ISR) program stream. An instruction pointer (IP) 303 is provided for use in maintaining an index at which the CPU 101 executes the first program stream 301 and the second program stream 302.

Figure 4:
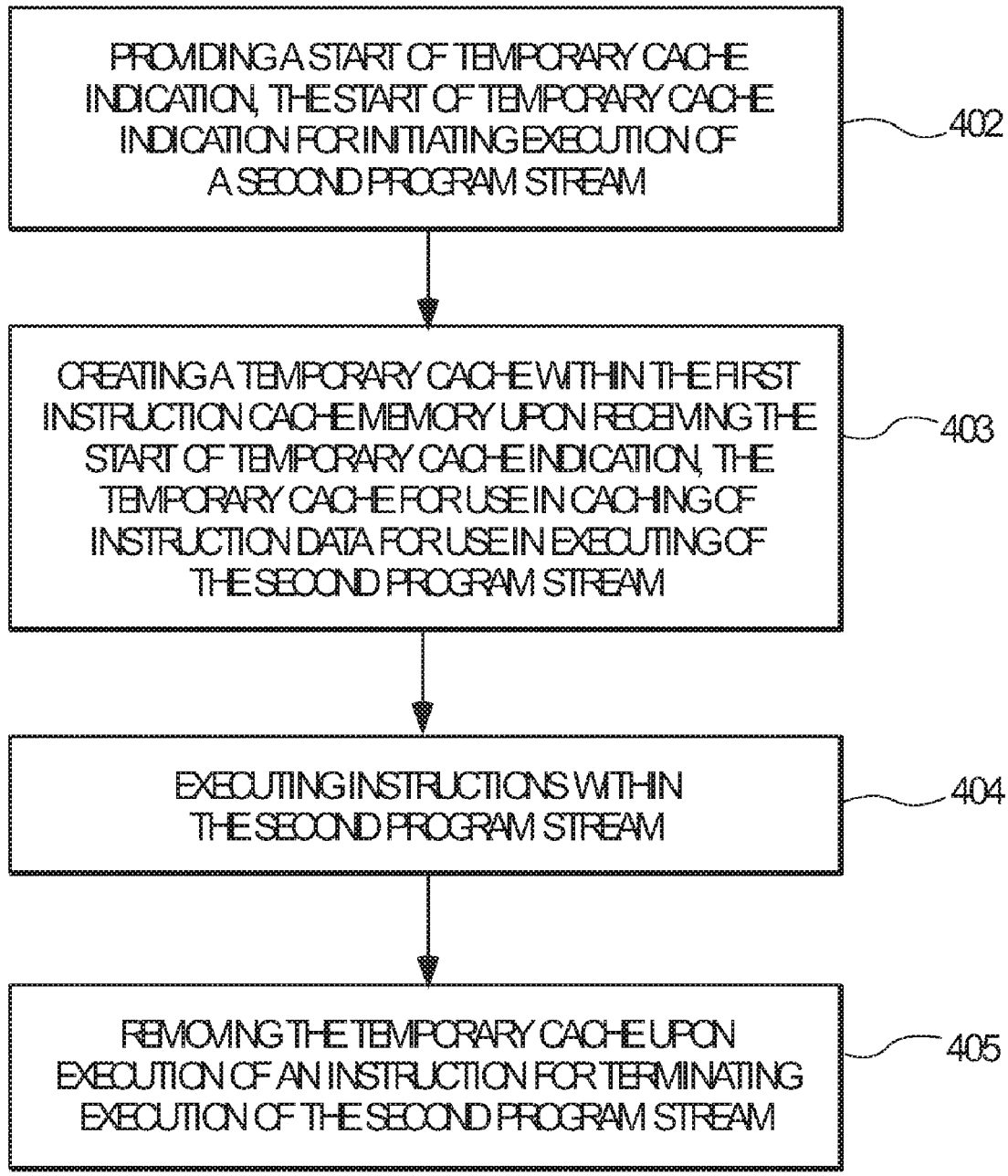
FIG. 4 illustrates a process flowchart for the embodiment of the invention shown in FIG. 2.

In FIG. 4, a process flowchart of the embodiment of the invention is shown. In accordance with the program streams depicted in FIG. 3, FIG. 5a illustrates a first program stream pre-interrupt portion 301a in execution from within the instruction cache 102 starting at instruction pointer (IP) address 303a. Fetches of instructions are performed from main memory 103 into the instruction cache 102 using the cache controller hardware 102a in order to reduce processor stall cycles during execution of the first program stream pre-interrupt portion 301a, from instruction pointer addresses 303a to 303b (FIG. 5a). A start of temporary cache indication (step 402 FIG. 4) is provided by the pre-interrupt portion 301a having an explicit instruction of a first type or by the determination circuit 201 determining at which point an instruction is provided indicative of an imminent execution of the second program stream 302 within the instruction cache 102. At this point, prior to execution of the second program stream 302, the determination circuit 201 instructs the cache controller 102a to partition the instruction cache 102 (step 403 FIG. 4) into a first memory portion 501a and second memory portion 501b (FIG. 5b). In the first memory portion 501a, a majority of cached instruction data associated with the first program stream pre-interrupt portion 301a is stored. When the whole instruction cache 102 is occupied by instruction data relating to the first program stream pre-interrupt portion 301a, the LRU process is preferably implemented by the cache controller 102a in order to free up memory space within the instruction cache 102 for use in enabling the creation of an available memory space that is to become the second memory portion 501b. The second memory portion 501b is used to implement a temporary cache 501b within the instruction cache 102.

Optionally, instead of implementing the LRU process, the instruction cache controller 102a implements a dedicated memory allocating process in order to free up memory space within the instruction cache memory 102 for use as the temporary cache 501b. For example, at least one predetermined cache way from the instruction cache 102 is set aside for use as the second memory portion 501b. That said, for an 8 way set associate cache, for example, three of the cache ways are set aside for implementing of the second memory portion 501b. Thus, the second memory portion is constrained to being ⅜ of the total available instruction cache memory space. The instruction cache controller 102a then preferably utilizes the LRU process for controlling the replacement of data blocks within these 3 cache ways, but is not used to select the cache ways that are to be used for implementing of the second memory portion 501b.

Further optionally, instead of having a fixed cache way assignment for the second memory portion 302, the interrupted program is stored in the instruction cache memory 102 with a LRU indication, such that it is the immediate candidate for replacement when the least recently used cache way is used in further processing.

Upon having allocated the temporary cache 501b within the instruction cache memory 102, data relating to the second program stream 302 is fetched from main memory 103 and stored in this second memory portion 501b for execution, in step 404 (FIG. 4), by the processor 101. Referring to FIG. 5b, the processor 101 executes the second program stream 302 stored in the temporary cache 501b from IP address 303c to 303d. Of course, if this second memory portion 501b is not of sufficient size to accommodate the amount of data optimal for execution of this second program stream 302, the LRU process is implemented in the temporary cache 501b in order to reduce the amount of fetches performed from main memory 103. Upon termination of this second program stream 302 at IP address 303d (FIG. 5b), as determined by the determination circuit having received an explicit instruction of a second predetermined type, the temporary cache 501b is eliminated, in step 405 (FIG. 4), by the determination circuit 201 and the entire instruction cache 102 is again available for use by the post interrupt portion 301b of the first program stream 301 (FIG. 5c). Execution of the post interrupt portion 301b of the first program stream 301 is resumed at IP address 303e. Thus, a majority of instruction data stored in the first memory portion 501a by the first program stream 301 is available to the first program stream 301 with minimal fetching operations from main memory 103.

Partitioning the instruction cache memory 102 into the first memory portion 501a and the second memory portion 501b, in the form of the temporary cache, (step 403 FIG. 4) realizes instruction processing advantages, such as a reduction in instruction cache trashing. Since the second program stream 302 typically does not contain loops instructions therein and is generally sequential in nature, instruction data fetched from main memory 103 for use in these generally sequential routines is rarely required subsequent to its execution. Therefore, the LRU process, executed by the instruction cache controller 102a, has an easy task of eliminating unnecessary instruction data from the instruction cache 102. Thus, the temporary cache 501b is advantageously relatively small, to act as a simple read ahead buffer for the second program stream 302, so that processor stall cycles are minimized for this second program stream 302, but not so large that a significant portion of the resulting first memory portion 501a is overwritten by implementing of the temporary cache 501b (step 403 FIG. 4). Since, the instruction cache first memory portion 501a contains data pertinent to the first program stream 301, overwriting a significant portion of this memory space is not advantageous because once execution of the first program stream 301b is resumed (FIG. 5c IP 303e), many fetches from main memory 103 are potentially necessary in order to resume execution of the first program stream post interrupt portion 301b in a fashion similar to its pre-interruption 301a fashion after interruption by the second program stream 302. Therefore, prior determination of the size of this second memory portion 501b is preferable, and potentially instructions are embedded into the program stream for use by the determination circuit 201 are implemented for determining a preferable size for the temporary cache 501b.

Advantageously, the instruction cache controller 102a, including the fetching hardware, fetches new instruction data into the temporary cache 501b for use by the second program stream 302 without overwriting a significant portion of the instruction data for use by the first program stream post interrupt portion 301b. The determination circuit 201, in combination with the LRU process, or optionally using the dedicated memory allocating process, determines which portions of the instruction cache 102 to allocate to the temporary cache 501b, so that preferably a minimum amount of instruction data pertinent to the first program stream post interrupt portion 301b is overwritten. Thus, after returning from execution of the second program stream 302, the CPU 101 again executes the post interrupt portion 301b of the first program stream at IP 303e (FIG. 5c). Where, in execution of the post interrupt portion 301b of the first program stream 301, preferably an amount instruction data pertinent thereto is still stored in the instruction cache 102. Thus for example, if the instruction cache 102 has a size of 32 kBytes, and assuming a 8-way set associativity, while restricting memory allocated to the temporary cache 501b to a that of a 4 Kbyte cache way, this results in 28/32 of the original cache data still being pertinent to the first program stream post interrupt portion 301b after return from execution of the second program stream 302.

Cache partitioning is implemented in two different manners in accordance with the invention. In the first manner, implementing instruction cache 102 partitioning is facilitated in hardware by having explicit instructions of a predetermined type that provide a start of temporary cache indication (step 402 FIG. 4) for triggering the determination circuit 201 for partitioning of the instruction cache. Once the determination circuit 201 reads an explicit instruction of a first type in the form of a start-of-temporary-cache instruction, the instruction cache 102 is partitioned into the first memory portion 501a and the temporary cache 501b (FIG. 5b), and the interrupt is processed. Of course, once the second program stream 302 has finished execution, then preferably an explicit instruction of a second type, in the form of an end-of-temporary-cache instruction, triggers the determination circuit 201 to free memory allocated to the temporary cache 501b so the entire instruction cache 102 is again useable by the first program stream post interrupt portion 301b. Of course, explicit instructions of the first and second types, in the form of hardware triggered interrupts and return from interrupt instructions, respectively, are supportable in an analogous fashion as will be evident to those of skill in the art.

Of course, in some cases it is preferable to disable the partitioning of the instruction cache 102 when the second program stream 302 includes instructions that are other than sequential in nature, for example, in the form of loop instructions embedded in second program stream 302. If the temporary cache 501b is not of a large enough size to accommodate caching of the whole second program stream 302, then multiple fetches are generated to main memory 103 in order to retrieve instruction data necessary for use in the execution of loop instructions embedded in the second program stream 302, the memory size allocated to the temporary cache 501b is too small, thus the second program stream 302 is larger than the working set of the temporary cache 501b. Thus, for every loop iteration, fetches are generated to main memory 103, which disadvantageously results in stall cycles being incurred by the processor 101 for every iteration of the loop. In this case, it is not preferable to partition the instruction cache 102 since this leads to degraded processor performance as well as increased power consumption. Of course to those of skill in the art it is known that large ISRs are considered to be bad programming practice. Typically ISRs are small in order to assure short interrupt response time, thus leaving laborious work to normal program tasks such as those in the first program stream.

In the second manner, second program stream 302 blocks of instruction data are identified as being stored in certain memory address regions within the main memory 103. In this manner, second program streams 302 are identified using addresses at which second program stream 302 instruction data is stored within the main memory 103. Of course, in order to identify the second program stream 302, preferably during compile and linking time of the program streams, load indications are provided within the program stream that preferably enable a majority of all the second program stream instruction data to be stored in a same memory address region within main memory 103. Thus, any fetching from this memory address region automatically allows for partitioning of the instruction cache (step 403 FIG. 4) for storing of this second program stream instruction data 302 within the temporary cache 501b. Advantageously, by using this approach, dedicated instructions used for implementing of the temporary cache 501b are obviated.

The determination circuit 201 thus performs a role of determining the type of instructions that are within the second program stream 302, and based on this determination, performs partitioning (step 403 FIG. 4) of the instruction cache memory 102. If the instruction cache memory 102 is not partitioned accordingly, then more stall cycles may be observed and hence the performance benefits are not realized. Of course, instead of the determination circuit 201 processing the instruction data to make a determination, the information is optionally encoded within the instruction data for decoding by the determination circuit 201 instruction analysis circuit.

Optionally, instead of implementing the determination circuit 201 in hardware, instructions are included within instruction data stored in memory 102 that are indicative of whether to partition the instruction cache or not. These instructions then result in the determination circuit 201, or other software routines being executed by the processor, determine whether it is advantageous to perform partitioning of the instruction cache 102 or not.

Under software control the cache memory 102 is optionally partitioned in dependence upon the type of instruction data being executed as a result of software determination. Where the software determines that partitioning of the cache is advantageous, this operation is performed in order to increase processing power of the CPU as well as to decrease power consumption of the cache memory circuit 102 and memory bandwidth requirements. More fetches performed from main memory 103 result in more power consumed by the circuits. Enabling and disabling logic gates, at a hardware level, used to implement the instruction cache memory 102 and main memory 103 realizes power savings.

Optionally, for a low hardware cost implementation of the present embodiment of the invention, the temporary cache 501b is created in a fixed cache way in the instruction cache 102. For example, the second memory portion 501b is only created in cache way 0. This advantageously allows the ISR to trash instruction cache data within this single cache way and not the other cache ways, thus leaving the other cache ways for use by the first program stream post interrupt portion 301b upon returning from execution of the second program stream 302. For example, for a total cache size of 32 KB with a blocksize of 64 bytes and with a total of 8 cache ways, a single predetermined number of cache ways with a fixed size of 4 Kbytes are allocated for implementing the temporary cache 501b.

Of course, when there are a lot of fetches being performed to main memory 103, fetching of 64 byte blocks is often not enough for the reduction of processor stall cycles. Thus increasing the size of the fetch to two sequential 64 byte blocks is often preferable. Of course, optionally multiple sequential 64 byte blocks may be prefetched.

Advantageously, by reducing instruction cache trashing as compared to prior art cache implementations, memory bandwidth requirements of the instruction data is decreased and the power consumption of the system is decreased. Less time is spent in executing of instructions as well as less time is spent in performing fetching operations to fetch data that has been removed by the execution of other instruction data. This has significant advantages for processor systems implemented in portable computing platforms, such as laptops.

Numerous other embodiments may be envisaged without departing from the spirit or scope of the invention.

What is claimed is:

1. A method of instruction cache management comprising the steps of: providing a first instruction cache memory; providing first instruction data within the first instruction cache memory for execution; providing a start of temporary cache indication, the start of temporary cache indication for initiating execution of a second program stream; creating a temporary cache within the first instruction cache memory upon receiving the start of temporary cache indication, the temporary cache for use in caching of instruction data for use in executing of the second program stream; executing instructions within the second program stream; and, removing the temporary cache upon execution of an instruction for terminating execution of the second program stream.

2. A method according to claim 1 comprising the step of providing a processor for execution of instruction data within the instruction cache and for execution of instruction data within the temporary cache for executing of the second program stream.

3. A method according to claim 1 wherein the second program stream has reduced instruction cache requirements as compared to the first instruction data within the first instruction cache memory.

4. A method according to claim 1 comprising a step of analyzing instruction data within the first instruction data in order to determine at which point in execution of the instructions to perform the step of creating the temporary cache.

5. A method according to claim 4 wherein the step of analyzing is performed by a software application including instruction data other than the first instruction data and the second program stream.

6. A method according to claim 4 wherein the step of analyzing comprises the step of assessing whether one of the first program stream and the second program stream include instructions of a predetermined type.

7. A method according to claim 6 wherein the instructions of a predetermined type are interrupt instructions.

8. A method according to claim 6 wherein the instructions of a predetermined type are return from interrupt instructions.

9. A method according to claim 4 wherein the step of analyzing comprises the step of assessing whether the second program stream is approximately sequential in nature and wherein the step of creating is performed in dependence upon the step of assessing.

10. A method according to claim 1 comprising the step of providing a main memory for storing of the second program stream at an address location, wherein the start of temporary cache indication is dependent upon the address location of the second program stream.

11. A method according to claim 1 wherein a size of the temporary cache is dependent upon an explicit instruction embedded in within the first instruction data.

12. A method of instruction cache management comprising the steps of: providing a first instruction cache memory; providing first instruction data within the first instruction cache for execution; providing an indication of a second stream of instruction data for execution one of in parallel with and in priority over the first instruction data, the second stream of instruction data having substantially smaller cache requirements over the cache requirements met by the first instruction data; creating a temporary cache within the instruction cache memory upon receiving an indication of the second stream's imminent execution, the temporary cache for use in caching of the instruction data of the second stream for use in execution of the second stream of instruction data; executing instructions within the second stream of instruction data; and removing of the temporary cache upon execution of an instruction for terminating execution of the second stream of instruction data.

13. A method according to claim 12 wherein the provided indication is an interrupt instruction.

14. A method according to claim 12 wherein the second stream of instruction data is approximately sequential in nature.

15. A method according to claim 12 wherein the second stream of instruction data is sequential in nature.

16. A method according to claim 12 wherein the indication is dependent upon an address in the first instruction cache memory that is used in a fetching operation that fetches instruction data for the second program stream from a predetermined memory location in the first instruction cache memory.

17. A method according to claim 12 comprising the step of providing a main memory for storing of the second stream of instruction data at an address location, wherein the indication of a second stream of instruction data is dependent upon this address location.

18. A cache memory comprising: an instruction cache memory for caching of instruction data of a first instruction data stream; a determination circuit for determining a presence of a second instruction data stream having known characteristics and for partitioning the instruction cache memory into a first memory portion and a temporary memory portion in dependence upon the presence of the second instruction data stream, wherein an instruction within the second instruction data stream is of an identifiable second type, the first memory portion for caching of instructions of the first instruction data stream and the temporary memory portion for caching of instructions of the second instruction data stream.

19. A cache memory according to claim 18 wherein the determination circuit is a hardware interrupt circuit.

20. A cache memory according to claim 18 wherein the second instruction data within the first instruction data stream is preceded by an explicit instruction.

21. A cache memory according to claim 18 wherein the known characteristics of the second instruction data stream comprise characteristics that identify the second instruction data stream as having instructions for executing in an approximately sequential nature.

22. A cache memory according to claim 18 wherein the known characteristics of the second instruction data stream comprise characteristics that identify the second instruction data stream as having instructions for executing in sequence.

23. A cache memory according to claim 18 wherein the second instruction data stream has reduced cache requirements over the first instruction data stream.

24. A cache memory according to claim 18 wherein the determination circuit comprises an instruction analysis circuit for identifying instructions of a predetermined type for creating of the temporary memory portion.

25. A cache memory according to claim 24 wherein the instructions of the predetermined type comprise an explicit instruction.

26. A cache memory according to claim 18 wherein the determination circuit comprises an instruction analysis circuit for identifying instructions of a predetermined type for terminating of the temporary memory portion.

27. A cache memory according to claim 26 wherein the instructions of the predetermined type comprise a return from interrupt instruction.

28. A cache memory according to claim 26 wherein the instruction of the predetermined type is an explicit instruction having one of a first type and a second type.

29. An integrated circuit comprising: an instruction cache memory for caching instructions for a first program stream; and, a circuit for creating and removing a temporary cache within the instruction cache memory, the temporary cache memory for being smaller in size than the instruction cache memory and for use in caching instructions within a second program stream that is other than the first program stream.

30. An integrated circuit according to claim 29 wherein the circuit is responsive to a first type of explicit instruction for creating the temporary cache.

31. An integrated circuit according to claim 30 wherein the circuit is responsive to a second type of explicit instruction for removing of the temporary cache.

32. An integrated circuit according to claim 29 wherein the circuit is responsive to an initiation of the second program stream that is sequential in nature for creating the temporary cache.

33. An integrated circuit according to claim 29 wherein the second program stream has substantially reduced instruction cache requirements over the first program stream.

34. An integrated circuit according to claim 29 wherein the circuit comprises an instruction analysis circuit for identifying instructions of a predetermined type and in response thereto for performing one of creating and removing of the temporary cache.

* * * * *